United States Patent [19]

Kuper et al.

[11] Patent Number: 4,944,567

[45] Date of Patent: Jul. 31, 1990

[54] FIBER OPTIC LASER BEAM DELIVERY SYSTEM

[75] Inventors: Jerry W. Kuper, Martinsville; Joseph J. Barrett, Morris Plains; William E. Langert; Martin C. Baker, both of Budd Lake, all of N.J.; Andrew N. Stephenson, Ventura, Calif.

[73] Assignee: Allied-Signal Inc., Morris Township, Morris County, N.J.

[21] Appl. No.: 294,317

[22] Filed: Jan. 9, 1989

Related U.S. Application Data

[63] Continuation-in-part of Ser. No. 117,766, Nov. 5, 1987, abandoned.

[51] Int. Cl.$^5$ ................................. G02B 6/32
[52] U.S. Cl. ........................... 350/96.18; 350/96.15; 350/96.1
[58] Field of Search ................. 350/96.1, 96.15, 96.18, 350/96.29, 96.3; 372/103

[56] References Cited

U.S. PATENT DOCUMENTS

| | | | |
|---|---|---|---|
| 3,242,440 | 3/1966 | Koester et al. | 372/103 X |
| 3,434,779 | 3/1969 | Darmen et al. | 372/103 X |
| 3,779,628 | 12/1973 | Kapron et al. | 350/96.15 |
| 3,803,512 | 4/1974 | Pettipiece | 372/103 X |
| 3,995,935 | 12/1976 | McCartney | 350/96.15 |
| 4,019,157 | 4/1977 | Hutchinson et al. | 372/103 X |
| 4,500,164 | 2/1985 | Kiyohara | 350/96.1 |
| 4,641,912 | 2/1987 | Goldenberg | 350/96.15 X |
| 4,654,532 | 3/1987 | Hirschfeld | 350/96.15 |
| 4,676,586 | 6/1987 | Jones et al. | 350/96.15 X |
| 4,688,884 | 8/1987 | Scrifres et al. | 350/96.15 |
| 4,697,867 | 10/1987 | Blanc et al. | 350/96.1 |
| 4,729,621 | 3/1988 | Edelman | 350/96.15 |
| 4,737,004 | 4/1988 | Amitay et al. | 350/96.15 |

FOREIGN PATENT DOCUMENTS

| | | | |
|---|---|---|---|
| 57-158823 | 9/1982 | Japan | 350/96.15 |
| 59-226310 | 12/1984 | Japan | 350/96.15 |
| 1541787 | 3/1979 | United Kingdom | 350/96.15 |

OTHER PUBLICATIONS

AMP Incorporated; "Designers Guide to Fiber Optics"; 1982; p. 64.

Primary Examiner—William L. Sikes
Assistant Examiner—John Ngo
Attorney, Agent, or Firm—Gerhard H. Fuchs; Richard Stewart

[57] ABSTRACT

The invention relates to a laser light beam delivery system for delivering a laser light beam from a source remote from the laser originating the light. The delivery system consists of an optical fiber having a double taper, i.e., a taper portion at each end with the fiber tapering at the input end and at the output end to a diameter substantially greater than the actual diameter of the fiber. This permits high power transmission capabilities in as much as the greater diameter portions distribute the average energy such that no damage to the fiber is presented.

12 Claims, 5 Drawing Sheets

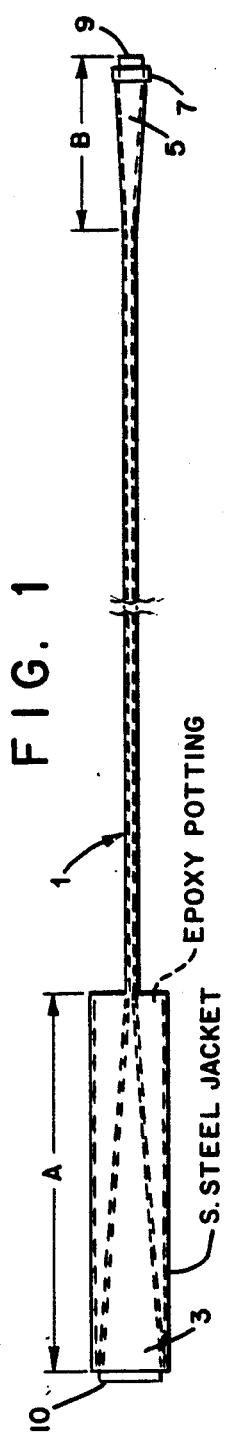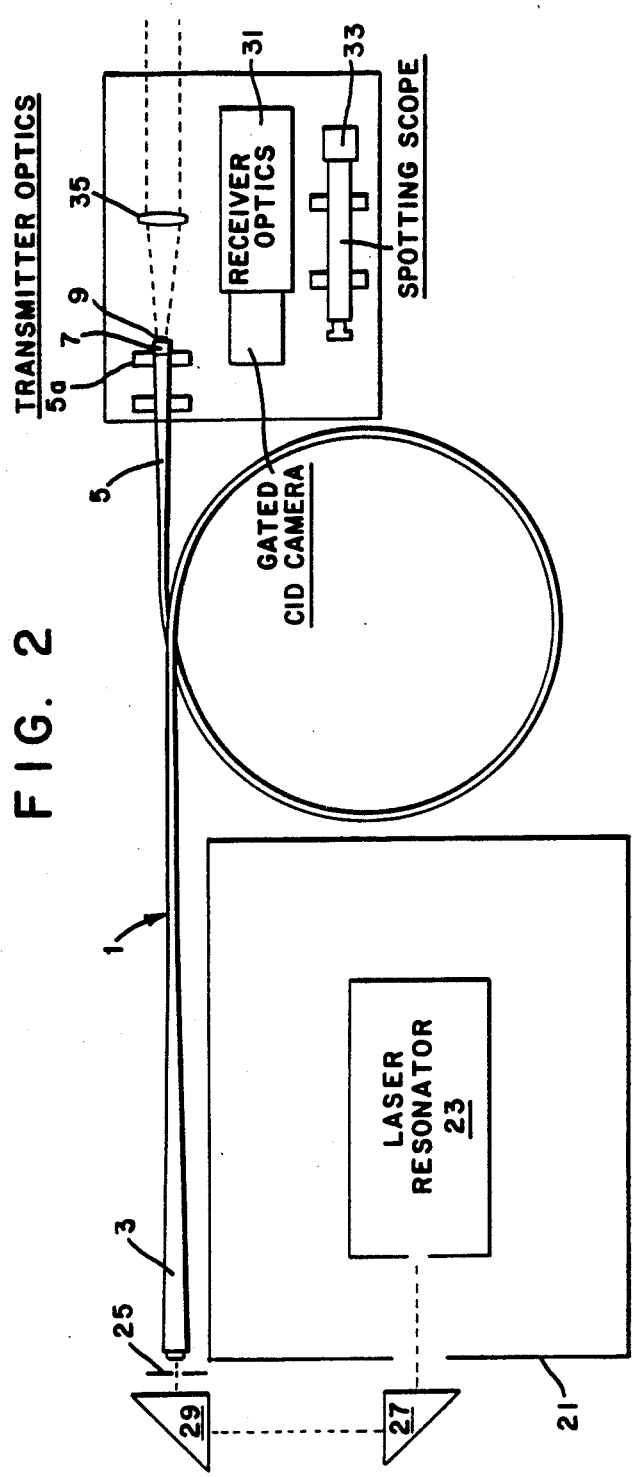
FIG. 1
FIG. 2

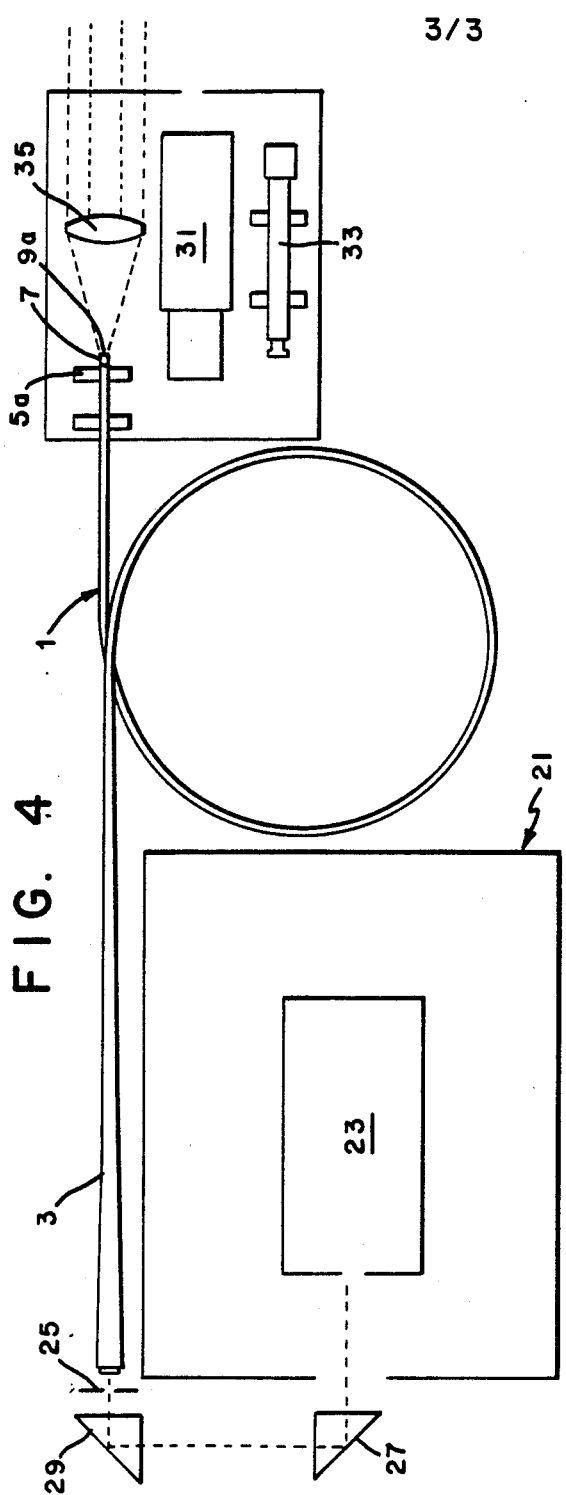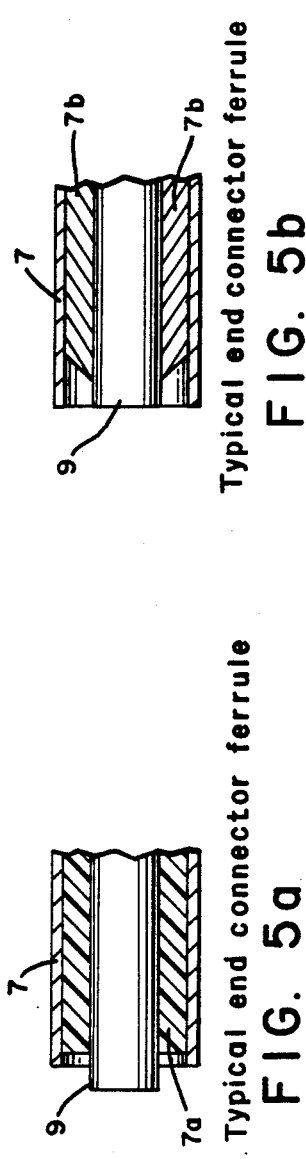

FIBER OPTIC LASER BEAM DELIVERY SYSTEM

This application is a continuation-in-part of our commonly assigned, co-pending U.S. patent application Ser. No. 17,766 filed Nov. 5, 1987.

BACKGROUND OF THE INVENTION

This invention relates to the use of an optical fiber in a laser system for delivering a laser light beam to a site remote from the laser light source. More particularly, the invention relates to such a laser light delivery system employing an optical fiber specially manufactured for coupling high peak power laser pulses from a laser resonator to transmitter optics, and for correcting for "hot" power distributions in the laser light beam to thereby generate from the output of the fiber a homogenous light beam.

There are numerous applications in the prior art which utilize fiber optics for the delivery of high power, i.e., Q-switched laser pulses. The high transmission and mechanical flexibility exhibited by fibers permits high levels of optical transmission through a flexible media of small diameter, if the proper fiber design is implemented. Thus, fiber optics can greatly reduce beam delivery system complexity by replacing bulky mirrors and/or prisms.

A major obstacle to the use of fiber optics has been their power transmission capabilities when employed in a high power transmission environment which often results in optical damage to the silica fiber. The ends of the fibers (glass/air interfaces) are the most susceptible areas for the damage to occur and the damage is frequently caused by "hot spots" present in the beam relative to the small surface area of the fiber end. In addition, depending on the fiber construction, parts of the laser beam can contact potting and clamping materials of the cable at the input end of the fiber and this can result in vaporization of these materials and subsequent deposition on the fiber face. This will produce absorption at the fiber surface which will dramatically lower its damage susceptibility.

Thus, while the prior art envisions using optical fibers in a low power transmission environment, for example, for endoscopic illumination in operations and/or other low power applications such as data communications, up to now there has been no reliable manner of implementing optical fibers in a high power environment. It is an object of the present invention to employ optical fiber systems in a high power environment.

By high power, it is generally understood that this relates to Q-switched laser beams of at least about 175–500 mJ/pulse with an average output energy density ranging from about 35 J/cm$^2$ up to about 100 J/cm$^2$ and higher (power densities of 1 MW/cm$^2$ to 2.2 GW/cm$^2$ and higher). Similarly, long pulse transmission energies ranging from about 1.0–2.5 J/pulse are considered (200–500 J/cm$^2$).

SUMMARY OF THE INVENTION

The high power laser beam delivery system has input optical means comprising an optical fiber having a taper at one end such that the diameter at the input end is larger, equal to, or nearly as large as the diameter of the incoming laser beam and larger than the diameter of the remainder of the optical fibe. The fiber may also be similarly tapered at the output end. In order to "funnel" the high power laser beam into the narrower, straight section of the fiber, we have found that it is essential that the taper angle of the tapered section not exceed a certain, very specific "critical angle", or else destruction of the input section will result under high power through-put conditions as contemplated by us. The present invention therefore provides the aforedescribed high power laser beam delievery system having an input tapered section wherein the taper angle is below a certain specific maximum "critical angle"; a method for determining the maximum "critical angle", and for determining the taper length that will provide that angle.

The fiber optic high power laser beam delivery system provided by the present invention is particularly suited for use in laser illuminator/target imaging systems, in which high power laser pulses are transmitted through the atmosphere over great distances.

The term "optical fiber" as used herein refers, as is conventional, to an optical light guide having a core of very high transparency which transmits the light. The core is surrounded by a transparent cladding layer of lower refractive index. When light is introduced into the core region of the clad fiber structure, the portion falling within a certain solid angle is guided by total internal reflection.

BRIEF DESCRIPTION OF THE DRAWINGS

Having briefly described the invention, the same will become better understood from the following detailed discussion taken in conjunction with the attached drawings wherein:

FIG. 1 is a schematic side view of the preferred fiber for delivering a laser light beam in accordance with the invention;

FIG. 2 is a schematic top view of a laser illuminator incorporating the laser light delivery system in accordance with the invention;

FIG. 4 is an alternative construction of the device of FIG. 2 showing the use of a lens instead of a tapered section at the output of the fiber delivery system: and FIGS. 5a and 5b are enlarged partial views of the end portion of the fiber in accordance with the invention secured for preventing contaminants on the end face of the fiber which could lead to damage due to excessive high power light absorption.

DETAILED DISCUSSION OF THE INVENTION

Figure 3:
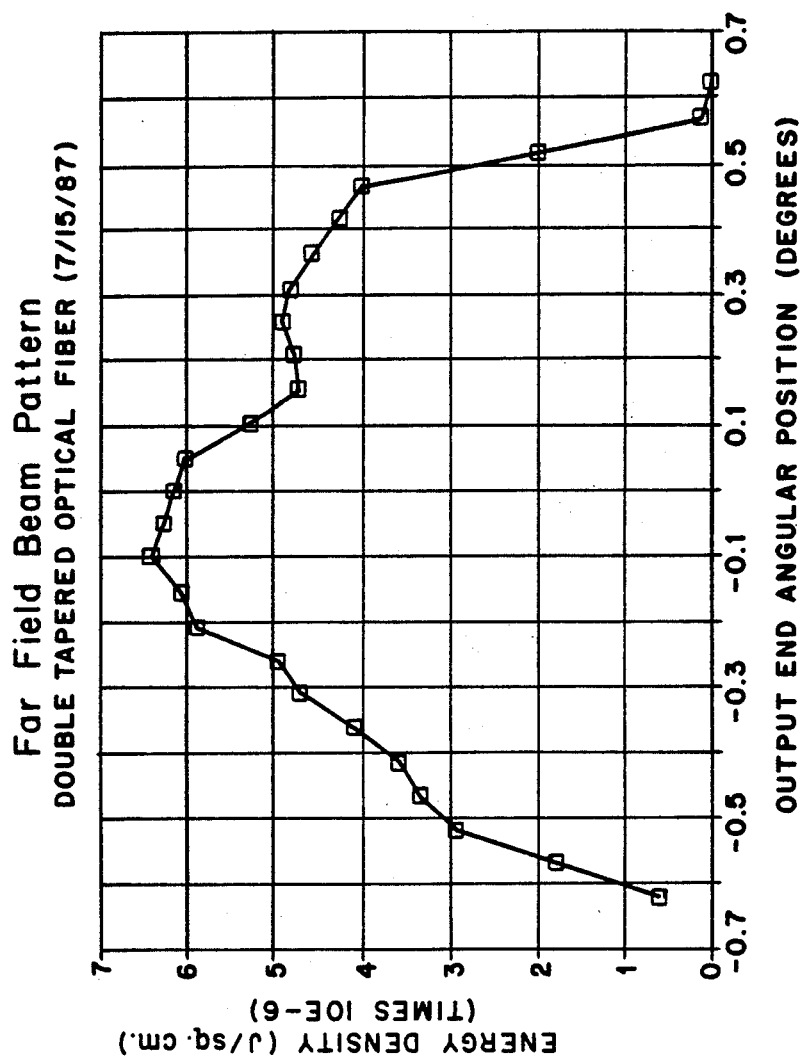
FIG. 3 is a graph showing the light distribution using a double tapered optical fiber in accordance with the invention.

As previously stated, the laser beam delivery system of the present invention incorporating a tapered section through which the input beam is fed into the straight fiber section is particularly designed for high power, pulsed operation. Under such operating conditions it becomes difficult to feed the laser beam into an optical fiber delivery system because of danger of optical damage to the input end of the fiber. Our experience has shown that the damage threshhold of the input (cross-sectional) surface of an optical fiber delivery system is only about 1/10 of the bulk carrying capacity of the fiber. By providing a tapered input end, a larger surface area is provided through which the beam can be fed into the fiber. We have now determined that for lasers operating with pulse widths in the order of about 10 to about 500 nanoseconds, more desirably between about 30 to about 250 nanoseconds, the maximum input energy density to the optical fiber delivery system is in the order of from about 1 to about 3.5 GW/cm$^2$ (10$^9$ Watts/cm$^2$) peak power. The bulk carrying capacity of the fiber per se is about 10 times this density. It should be clear that, within the above-stated ranges, a narrower pulse width (i.e. shorter pulse duration) will tend to reduce the permissible maximum input energy density before damage to the input surface will occur and, conversely, a wider pulse width (i.e. longer pulse duration) will tend to permit higher energy densities. An additional factor is the optical quality of the input surface the higher the optical quality of that surface, the higher the tolerable input energy density before damage will occur.

Within the tapered section of the fiber, the optical energy of the laser pulse is being compressed into a progressively smaller cross-sectional area, until the pulse enters the straight fiber section. Compression occurs by virtue of the outer rays "bouncing" off the inner surface of the tapered section along its length. With each bounce, however, the impact angle steepens, until no further reflection occurs and the ray exits from the tapered fiber section which, under conditions of high power operation, will result in destruction of the fiber conduit.

Typically, the laser illuminator/target imaging system utilizes high peak power Q-switched laser pulses from an alexandrite laser operating in the region of 750 nm. Typical pulse energies are in the range of 20 mJ to 400 MJ with pulse durations of 50 nanoseconds (ns) to about 250 nanoseconds. For a laser pulse energy of 100 mJ and a pulse duration of 50 ns, the peak power is 2 megawatts (MW). If we wish to transmit this laser pulse through an optical fiber with a core diameter of 600 microns, the power density at the input face of the fiber would be $$\frac{2 \times 10^6}{(\pi/4)(0.06)^2} = 0.71 \times 10^9 \ W/cm^2 = 0.71 GW/cm^2$$

The energy at the fiber's input face would be $$\frac{0.1}{(\pi/4)(0.06)^2} = 35.4 J/cm^2$$

Surface damage of a fused silica (SiO$^2$) optical fiber occurs at an energy density of about 100 J/cm$^2$ for a high quality optical surface (10/5 scratch-dig) at this wavelength and pulse duration. Any deviation from this surface quality will reduce this damage threshold level. The corresponding power density damage threshold of a good quality fused silica surface is about 2 GW/cm$^2$ (with a range of 1 to 3.5 GW/cm$^2$ depending on the spatial uniformity of the input laser beam). The bulk damage threshold for good optical quality fused silica is about one order of magnitude greater than the surface damage threshold. Based on these surface threshold values for fused silica, the maximum laser energy which could be injected into a 600 micron diameter fused silica optical fiber is $$E_{max} = (100 J/cm^2)\left(\frac{\pi}{4}(0.06)^2\right) = 0.28 J.$$

In practice, the laser spot at the input surface of the optical fiber should be slightly smaller than the fiber diameter so as to alleviate alignment problems and to prevent the laser from vaporizing the fibers' outer jacket. A practical laser spot diameter for coupling into a 600 micron fiber would be about 500 microns. The corresponding maximum input energy for this case would be 0.20 J or 200 mJ. The maximum peak power for a 50 ns laser pulse would be $$P_{max} (2GW/cm^2)\left(\frac{\pi}{4}(0.05)^2\right) = 3.9 MW.$$

The spot diameter of a focussed laser beam is given by the formula $$D_o = F\phi$$

where F is the focal length of the focussing lens and $\phi$ is the beam divergence of the laser (in radians). For example, a multimode laser with a beam divergence of 3 milliradians would produce a spot with a diameter of 300 microns when focussed with a 10 cm focal length lens. In order to couple this beam into a 600 micron fiber, the focussing lens is positioned so that the focal region occurs in front of the fiber's input surface. The lasers+ spot size diverges to a 500 micron diameter at the optical fiber's input surface. If the diameter of the laser beam is $D_L$ at the focussing lens, the minimum spot diameter occurs at an effective focal length $F_{eff}$ of $$F_{off} = \frac{FD_L}{(D_L - F\phi)}$$

where F and $\phi$ were previously defined. In our example for a 3 milliradian divergent laser beam focussed with a 10 cm focal length, the effective focal length is 10.53 cm for a $D_L$ value of 6 mm. The total distance between the focussing lens, and the input surface of the optical fiber (see FIG. 1) is $$F_T = F_{off}\left(1 + \frac{D_o}{D_L}\right)$$

where $D_o$ is the diameter of the laser spot at the fibers input face. If we choose a $D_o$ value of 500 microns as discussed above, then the value of $F_T$ calculated from the above equation is 11.41 cm.

For some imaging applications, it is necessary to use laser pulse energies greater than 200 mJ. These higher pulse energies have been transmitted successfully by using optical fibers with integral tapered ends. Alternately, larger core fibers may be employed with subsequent loss of flexibility in order to achieve a larger input surface area. If the input taper diameter, $D_T$, is larger than the laser beam diameter. $D_L$, then no focussing lens is needed to couple into the fiber. The tapered section channels the input laser beam into the fiber by means of total internal reflection. If we specify $D_T$ to be just slightly larger than $D_l$, then there is a minimum taper length, $L_T$, which is required to couple the laser beam into the optical fiber's straight section. The taper half angle, $\theta_T$, is equal to $$\theta_T = \frac{1}{2N_R}(90° - \theta_c)$$

where $N_r$ is the number of reflections of the outer ray of the laser beam in the taper and $\theta_c$ is the critical angle of the optical fiber defined as $$\theta_c = \sin^{-1}\left(\frac{\eta_{cladding}}{\eta_{core}}\right).$$

In this equation, $\eta_{cladding}$ and $\eta_{core}$ are the refractive indices of the cladding and core, respectively.

We pick up an initial value of $N_R$ equal to 3 and calculate the input taper diameter, $D_T$, using the equation $$D_T = D_F \prod_{N=2}^{N_R}\left(\frac{\tan 2(N-1)\theta_T + \tan\theta_T}{\tan 2(N-1)\theta_T - \tan\theta_T}\right).$$

If the calculation yields $D_T > D_l$, then we can repeat the calculation using $N_R = 2$ to determine if the condition $D_T > D_L$ still holds. However, if the calculation yields $D_T < D_L$, then we increase $N_R$ by unity and repeat the calculation until $D_T > D_L$. This final value of $D_T$ is then used to calculate the minimum taper length, $L_T$, according to the equation $$L_T = \frac{D_T - D_F}{2\tan\theta_T}.$$

For example, typical values for $\eta_{cladding}$ and $\eta_{core}$ are 1.43761 and 1.45434, respectively, for a fused silica fiber with a numerical aperture of 0.22 and a laser wavelength of about 750 nm. The calculated critical angle is 81.30° and the taper angle for an $N_R$ value of 6 is equal to 0.725°. The value of $D_T$ calculated using the above equation is 6.58 mm which is large enough to transmit a laser beam with a $D_L$ value of 6 mm. The minimum taper length for this case is equal to 23.6 cm.

The transmission of high power laser beams by tapered fibers requires that the output end of the fiber also be tapered so that the energy and power densities at the exit surface will be less than the optical damage threshold of the fiber's core material. A 600 micron fiber body with taper sections on both input and output ends was tested in a laser illuminator/target imaging system. This double tapered optical fiber had an overall length of 2 meters and input and output tapered end diameters of 6 mm and 1.2 mm, respectively. The length of the input tapered section, $L_T$, was 60 cm. Successful transmission of 50 ns Q-switched alexandrite laser pulses with pulse energies greater than 400 mJ has been achieved using this double tapered optical fiber.

The preceding analysis concerning the transmission of high power laser beams in optical fibers made specific reference to the transmission of 750 nm alexandrite laser pulses in fused silica optical fibers. This analysis can readily be extended to other wavelengths in the visible, ultraviolet and infrared spectral regions by substituting the appropriate optical damage threshold for the wavelength of interest. Also, the use of optical fibers constructed of materials with higher optical damage thresholds, e.g., sapphire $Al_2O_3$) would result in improved high power transmission capabilities.

The final aspect of the fiber optic delivery system involves the optics used to transfer the light from the output end of the fiber to a target. A well defined, uniform illumination beam is obtained when the output end of the fiber is imaged on the target. This can be accomplished by using a simple lens as shown in FIG. 4. If the transmitter lens has a focal length, F, then the distance, X, between the output end of the fiber and the transmitter lens is given by the equation $$X = \frac{FR}{R - F}$$

where R is the distance between the transmitter lens and the target. If D is the diameter of the output end of the fiber, then the angular field of view (FOV) of the illuminated region of the target is $$FOV = 2\tan^{-1}\left[\frac{D(R - F)}{2FR}\right]$$

For an output fiber diameter of 1.2 mm, a target range of 1 km and a transmitter lens with a 10 cm focal length, the calculated FOV is 0.69°. Other FOV values can be obtained by using transmitter lenses with different focal lengths or by using a more complicated transmitter lens system such as a doublet or a zoom lens.

In FIG. 1 there is shown a preferred fiber for use in connection with the invention. The fiber 1 has central portion of standard diameter, i.e., typically 600–660 micron and is a multimode step index fiber comprised of silica. The input end 3 is tapered to a larger size wherein the end face is approximately 6 mm in diameter. The maximum taper angle is determined as described, supra. At the output end a similar type taper extending only over about 10 inches is also obtained so that the output end 5 over that region B which comprises the tapered portion expands into an end face 9 with diameter of approximately 1.2 mm. Typically the input end 3 will include a stainless steel jacket into which the fiber is epoxy-potted with the face extruded 10 by a pre-determined distance. The jacket protects the tapered section of the fiber A from stress-induced breakage, as manufacture of the fiber by conventional means results in an end portion which is highly fragile as compared to the typical optical fiber which is highly flexible such as the middle portion thereof. The extruded face both facilitates safe cleaning and further removes the non-glass portion of the fiber end from the fiber face (thus reducing the role of the external aperture in preventing evaporated epoxy/metal particles from causing face absorption and consequent damage). The output end 5, as in the case with the input end 3, also is enveloped in a stainless steel collar 7 and epoxy-potted with an extruded face 9. This, in turn, protects this likewise-fragile tapered portion and facilitates the safe cleaning of the output fiber face. In the medical case where 200 $\mu m$ core fiber is used, only the input end would be tapered. The output end would be straight maintaining its 200 $\mu m$ core size.

FIG. 2 illustrates a preferred environment in which the invention is employed. More specifically, FIG. 3 illustrates a laser 21 having a laser resonator 3, preferably an alexandrite laser such as that described in U.S. Pat. Nos. 4,272,733 and RE 31,057. The alexandrite laser includes a laser resonator 23 with a fiber input aperture 25, preferably a sapphire aperture to restrict the laser beam so that, as will be later described, it enters the center of the double tapered optical fiber. This arrangement will prevent the laser beam from striking the edges of the fiber at the input which would result in vaporization of material and damage to the fiber's input face. Two prisms 27 and 29 are arranged to provide a u-shaped consecutively 90° change in path for the laser light beam into the input end 3 of the fiber 1 which is of a diameter of typically about 6 mm. The other end 5 of the fiber 5 is held by a holder 5a and by a sleeve 7 with the end thereof projecting outwardly at portion 9. It is associated with the optical portion of the laser illuminator which comprises typically the receiver optics 31 made up of a gated ICID camera as well as a spotting scope 33 which enables targeting upon the target to be illuminated at night. At the output of the fiber there is arranged optionally a lens 35 which serves to focus the diverging beam coming out of the end face of the fiber into parallel or other desired paths. Of course, when the output end of the fiber is tapered, a lens is not necessary and is only used to achieve specifically desired results.

In the environment of solid state lasers such as alexandrite which has been indicated as being preferred, but also for example, in use with Nd:Yag, Nd:Bel, chromium doped lanthanum beryllate and the like it is often the case that the output beam will include hot spots and such hot spots tend to damage optical fibers. In accordance with the invention by having the double taper, the input energy distribution is spread over a greater surface area (reducing the peak energy density) and is homogenized upon passage through a properly aligned and constructed fiber, thus, eliminating the hot spots in the output laser beam. The typical resulting far field beam, pattern at the output end is illustrated by FIG. 3 which shows a greater energy density at the center with a typical gaussian distribution drop off at the outer edges.

As an alternative construction, while the input end is preferred to be tapered, it is often the case that the output end need not be tapered. This is shown in FIG. 4 which shows the laser 21 feeding the light in a similar configuration to FIG. 2 into a tapered end of a fiber. The output end 9a is not tapered and one needs to place an output lens 35 in the output path to achieve collimated or narrow angle output.

As previously noted, the end of the fiber is preferably arranged such that it projects beyond the holding device. These constructions are generally shown in FIGS. 5a and 5b with 5a showing a metal sleeve 7 with potting material 7a received therein to hold the fiber end which fiber end 9 protrudes beyond. As an alternative, FIG. 5b shows a metal sleeve 7 having stainless steel finger clamps 7b again, upon compression of the metal sleeve 7 to compress the finger clamp 7b, the sleeve and clamps receding and the end 9 of the fiber projecting beyond.

EXAMPLE

The arrangement of FIG. 2 as tested. The double tapered optical fiber was rigidly attached to the outside of the laser housing by means of two brackets. The integrally constructed fiber (fiber and tapered section one continuous piece) had an overall length of 2 m with a 6 mm to 600 micron taper on the input end. The central portion consisted of a straight 600 micron section and a 600 micron to 1.2 mm taper comprised the output end. The output end of the fiber was attached to a tripod-mounted plate which supported the transmitter optics, receiver optics, gated ICID camera and a spotting scope. The diverging output from the double tapered optical fiber was collected by a single 50 mm focal length lens. The full beam angle, $\theta$, of the transmitted laser beam was $\theta$ equal approximately to tangent$^{-1}(D_0/F1)$ where $D_0$ equals diameter of the fiber's output aperture and F1 equals the focal length of the transmitter lens.

The transmitted beam diameter, measured on a calibrated target board at a range of 104 feet, was equal to 2.25 feet. The transmitted beam appeared to be very round and quite uniform. A detector was placed in front of the calibrated target board in order to measure the beam energy density at equal intervals along a horizontal segment through the beam center. The beam was moved across the stationary detector by translating the transmitter lens in 0.002 inch increments in a horizontal direction normal to the beam propagation direction. The laser used was an alexandrite laser which was operated at a pulse repetition frequency of 4 Hertz and with a pulse energy of about 0.1J. The data obtained in accordance with this test is set forth in the following table.

TABLE 1

Beam Profile Data at 104 ft. range.
Beam diameter @ 104 ft. = 2.25 ft. (27")
Beam power = 0.65 W @ 4 Hz. Pulse energy = 0.16 J.
Full angle of beam - 1.24 degrees.

| Lens Micrometer Reading | Angular Position Reading (Edge) | Angular Position Reading (Center) | Pryo Reading I (J/sq.cm) | Pryo Reading II (J/sq.cm) | Reading Average (J/sq.cm) |
|---|---|---|---|---|---|
| 0.223 | 0.0000 | −0.6200 | 4.80E-06 | 7.10E-06 | 5.95E-06 |
| 0.225 | 0.0517 | −0.5683 | 1.77E-05 | 1.80E-05 | 1.79E-05 |
| 0.227 | 0.1033 | −0.5167 | 3.10E-05 | 2.80E-05 | 2.95E-05 |
| 0.229 | 0.1550 | −0.4650 | 3.40E-05 | 3.30E-05 | 3.35E-05 |
| 0.231 | 0.2067 | −0.4133 | 3.50E-05 | 3.70E-05 | 3.60E-05 |
| 0.233 | 0.2583 | −0.3617 | 3.90E-05 | 4.30E-05 | 4.10E-05 |
| 0.235 | 0.3100 | −0.3100 | 4.80E-05 | 4.60E-05 | 5.70E-05 |
| 0.237 | 0.3617 | −0.2583 | 4.70E-05 | 5.20E-05 | 4.95E-05 |
| 0.239 | 0.4133 | −0.2067 | 5.90E-05 | 5.90E-05 | 5.90E-05 |
| 0.241 | 0.4650 | −0.1550 | 6.50E-05 | 5.60E-05 | 6.05E-05 |
| 0.243 | 0.5167 | −0.1033 | 6.40E-05 | 6.40E-05 | 6.40E-05 |
| 0.245 | 0.5683 | −0.0517 | 6.30E-05 | 6.20E-05 | 6.25E-05 |
| 0.247 | 0.6200 | 0.0000 | 5.90E-05 | 6.40E-05 | 6.15E-05 |
| 0.249 | 0.6717 | 0.0517 | 6.00E-05 | 6.00E-05 | 6.00E-05 |
| 0.251 | 0.7233 | 0.1033 | 5.10E-05 | 5.40E-05 | 5.25E-05 |
| 0.253 | 0.7750 | 0.1550 | 4.60E-05 | 4.80E-05 | 4.70E-05 |
| 0.255 | 0.8267 | 0.2067 | 4.70E-05 | 4.80E-05 | 4.75E-05 |
| 0.257 | 00E-07 | 0.2583 | 5.00E-05 | 4.80E-05 | 4.90E-05 |
| 0.259 | 0.9300 | 0.3100 | 4.80E-05 | 4.80E-05 | 4.80E-05 |
| 0.261 | 0.9817 | 0.3617 | 4.50E-05 | 4.60E-05 | 4.55E-05 |
| 0.263 | 1.0333 | 0.4133 | 4.30E-05 | 4.20E-05 | 4.25E-05 |
| 0.265 | 1.0850 | 0.4650 | 4.10E-05 | 3.90E-05 | 4.00E-05 |
| 0.267 | 1.1367 | 0.5167 | 1.90E-05 | 2.10E-05 | 2.00E-05 |
| 0.269 | 1.1883 | 0.5683 | 1.40E-06 | 4.00E-07 | 1.00E-06 |
| 0.271 | 1.2400 | 0.6200 | 1.00E-08 | 1.00E-08 | 1.00E-08 |

We claim:

1. An optical fiber means for delivering a high power laser beam, said optical fiber means comprising an optical fiber having and input end for receiving a collimated laser beam, and an output end for delivering the laser beam, wherein said input end incorporates an integrally formed cladded tapered fiber section, said cladded input section having a taper angle not greater than a taper angle $\theta_c$, measured with reference to the center line of the tapered section, is determined by the relationship $$\theta_c = \sin^{-1}\left(\frac{\eta_{cladding}}{\eta_{core}}\right),$$

wherein $\eta_{core}$ and $\eta_{cladding}$ represent the refractive indices of the core material and the cladding material, respectively.

2. The optical fiber means of claim 1 further comprising means for focusing the laser beam into the tapered input end.

3. The optical fiber means of claim 1 further comprising an integrally formed tapered output section.

4. The optical fiber means of claim 3 incorporated into a laser illuminator/target imaging system.

5. The optical fiber means of claim 3 wherein the optical fiber comprises a multimode step index fiber comprised of silica.

6. The method of delivering a high power laser beam which comprises introducing a collimated laser beam into an optical fiber means according to claim 1, and directing it to a target by means of the optical fiber.

7. The method of claim 6 wherein the laser beam has a power density of at least about 1 MW/cm$^2$.

8. The method of claim 6 wherein the laser beam is a pulsed, Q-switched beam having a pulse energy of at least about 175 mJ/pulse.

9. The method of claim 6 wherein the laser beam is a pulsed beam having a pulse energy of at least about 175 mJ/pulse, and is generated by an alexandrite laser operating in the wavelength region around 750 nm.

10. The method of delivering a high power laser beam which comprises introducing a collimated laser beam into an optical fiber having integrally formed cladded tapered input and output ends, wherein said tapered input end comprises a tapered fiber section having a taper angle not greater than a taper angle $\theta_c$, measured with reference to the center line of the tapered section, which is determined by the relationship $$\theta_c = \sin^{-1}\left(\frac{\eta_{cladding}}{\eta_{core}}\right),$$

where $\eta_{core}$ and $\eta_{cladding}$ represent the refractive indices of the core material and the cladding material, respectively, and directing it to a target by means of the optical fiber.

11. The method of claim 10 wherein the laser beam has a power density of at least about 1 MW/cm$^2$.

12. The method of claim 10 wherein the laser beam is a pulsed beam having a pulse energy of at least about 175 mJ/pulse, and is generated by an alexandrite laser operating in the wavelength region around 750 nm.

* * * * *